(12) United States Patent
Tsai et al.

(10) Patent No.: US 10,782,576 B2
(45) Date of Patent: Sep. 22, 2020

(54) ARRAY SUBSTRATE AND DRIVING METHOD THEREOF

(71) Applicant: WUHAN CHINA STAR OPTOELECTRONICS TECHNOLOGY CO., LTD., Wuhan, Hubei (CN)

(72) Inventors: Yucheng Tsai, Hubei (CN); Zhou Zhang, Hubei (CN); Changwen Ma, Hubei (CN); Pan Xu, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 16/320,283

(22) PCT Filed: Nov. 23, 2018

(86) PCT No.: PCT/CN2018/117098
§ 371 (c)(1),
(2) Date: Jan. 24, 2019

(87) PCT Pub. No.: WO2020/062520
PCT Pub. Date: Apr. 2, 2020

(65) Prior Publication Data
US 2020/0183238 A1    Jun. 11, 2020

(30) Foreign Application Priority Data

Sep. 28, 2018  (CN) .......................... 2018 1 1138545

(51) Int. Cl.
*G06F 3/041* (2006.01)
*G02F 1/1362* (2006.01)
(Continued)

(52) U.S. Cl.
CPC ...... *G02F 1/136286* (2013.01); *G02F 1/1368* (2013.01); *G02F 1/136209* (2013.01);
(Continued)

(58) Field of Classification Search
CPC .............. G09G 3/3688; G09G 3/3266; G09G 2310/0264; G06F 3/0416; G06F 3/0412; G06F 3/041
See application file for complete search history.

(56) References Cited

U.S. PATENT DOCUMENTS 8,553,013 B2 * 10/2013 Kim ...................... G06F 3/0412
178/18.06
9,740,355 B2 * 8/2017 Li .......................... G06F 3/0412
(Continued)

*Primary Examiner* — Vijay Shankar
(74) *Attorney, Agent, or Firm* — Muncy, Geissler, Olds & Lowe, P.C.

(57) ABSTRACT

An array substrate and a driving method thereof are provided. The method includes transmitting a source signal to a data line, wherein the source signal includes a first time period, a second time period, and a third time period; wherein the first time period is configured to be used by a thin film transistor of a sub-pixel unit to charge a display of a display electrode, the second time period is a touch period, and the third time period is configured to charge the common electrode through switching the switch.

15 Claims, 4 Drawing Sheets

(51) Int. Cl.
*G02F 1/1368* (2006.01)
*G09G 3/36* (2006.01)
*G09G 3/3266* (2016.01)

(52) U.S. Cl.
CPC ......... *G09G 3/3266* (2013.01); *G09G 3/3688* (2013.01); *G02F 2001/136222* (2013.01); *G02F 2201/121* (2013.01)

(56) References Cited

U.S. PATENT DOCUMENTS

| | | | | |
|---|---|---|---|---|
| 9,785,280 B2* | 10/2017 | Pang | .................... | G06F 3/0416 |
| 9,851,831 B2* | 12/2017 | Wang | ...................... | G06F 3/044 |
| 9,880,658 B2* | 1/2018 | Xi | ......................... | G06F 3/0416 |
| 10,324,322 B2* | 6/2019 | Tsai | ...................... | G02F 1/1343 |

* cited by examiner

ARRAY SUBSTRATE AND DRIVING METHOD THEREOF

FIELD OF INVENTION

The present disclosure relates to an array substrate and a driving method thereof, and in particular to an array substrate and a driving method thereof applied inside a display screen and a display panel embedded with a touch sensor.

BACKGROUND OF INVENTION

Currently, a touch panel function is embedded in a liquid crystal pixel of a touch screen. Because of low cost and thinness of manufacturing materials advantages, it is increasingly valued by display panel manufacturing companies. In prior art, a touch screen is attached to an upper surface of a thin film field transistor liquid crystal display (TFT-LCD) device. The function of sensing touch is realized by the touch screen, so that the display screen and the touch screen are separately driven and realize their respective functions.

As shown in FIG. 1, a wiring structure of a display panel in which a touch sensor (TP full in cell) is embedded in a general display screen, wherein each sub-pixel unit 11 is surrounded by a gate line 12, a first data line 13, and a second data line 14, and the sub-pixel unit 11 is formed with a black matrix (BM). The black matrix includes a horizontal black matrix area 15 and two vertical black matrix areas 16, 17. The horizontal black matrix area 15 is configured to pass the gate line 12, and is provided with a display thin film transistor 18. The vertical black matrix areas 16, 17 are respectively located on opposite sides of the sub-pixel unit 11, and the vertical black matrix areas 16, 17 are respectively configured to pass the first data line 13 and the second data line 14.

As shown in FIG. 2, a corresponding timing control of the display panel is illustrated, wherein a time division control is performed in a display period T1 and a touch period T2 by using a plurality of control signals, such as clock signals (CK1, CK2, CK3, CK4), selection signals (MUX_R, MUX_G, MUX_B), source signals (SOURCE), and common signals (VCOM).

With the development of smartphones and tablets, smartphones are moving toward the trends of higher screen ratios and high brightness at present. However, the high screen ratios and brightness of the abovementioned display panel still need to be improved.

SUMMARY OF INVENTION

An object of the present disclosure is to provide an array substrate and a driving method thereof. In each of the sub-pixel units, the corresponding first gate line and the corresponding second gate line, the thin film transistor, and the switch are arranged on the horizontal black matrix area, and the corresponding data line arranged on the vertical black matrix area. So that the chip size can be reduced by saving chip data lines, and the width of the side frame can be reduced.

In order to solve the above problems, the technical solution provided by the present disclosure is as follows:

The present disclosure provides an array substrate, which comprises a plurality of data lines, a plurality of first gate lines, a plurality of second gate lines, and a plurality of sub-pixel units surrounded by the data lines and the first gate lines, wherein each of the second gate lines is juxtaposed on one side of the corresponding first gate line; wherein each of the sub-pixel units defines a color filter area, a horizontal black matrix area, and a vertical black matrix area; the horizontal black matrix area and the vertical black matrix area are located on two adjacent sides of the color filter area, respectively; the sub-pixel unit comprises a thin film transistor and a switch, the thin film transistor is configured to electrically connect a display electrode and the corresponding first gate line, the switch is configured to electrically connect a common electrode and the corresponding second gate line; in each of the sub-pixel units, the corresponding first gate line, the corresponding second gate line, the thin film transistor, and the switch are arranged in the horizontal black matrix area, and the corresponding data line is arranged in the vertical black matrix area; the data lines of the array substrate are vertically arranged, and the first gate lines and the second gate lines of the array substrate are horizontally arranged.

In one embodiment of the present disclosure, each of the sub-pixel units further comprises a display capacitor electrically connected to the thin film transistor and the corresponding display electrode.

In one embodiment of the present disclosure, each of the sub-pixel units further comprises a common capacitor electrically connected to the switch and the corresponding common electrode.

In one embodiment of the present disclosure, in each of the sub-pixel units, the corresponding first gate line and the corresponding second gate line are arranged on opposite sides of the horizontal black matrix area, respectively.

In one embodiment of the present disclosure, the first gate line is configured to control a level transmission of the first gate line through a plurality of high frequency clock signals; the second gate line is configured to be controlled by a global signal to charge the common electrode through switching the switch.

In one embodiment of the present disclosure, a source signal of the data line is composed of a first time period, a second time period, and a third time period, wherein the first time period is configured to be used by the thin film transistor of the sub-pixel unit to charge a display of the display electrode, the second time period is a touch period, and the third time period is configured to charge the common electrode through switching the switch.

To achieve the above object of the present disclosure, an embodiment of the present disclosure provides a touch display screen, including the array substrate provided by the embodiment of the present disclosure.

To achieve the above object of the present disclosure, an embodiment of the present disclosure provides a driving method of the array substrate, the method comprises: transmitting a source signal to the data line, wherein the source signal is composed of a first time period, a second time period, and a third time period; wherein the first time period is configured to be used by the thin film transistor of the sub-pixel unit to charge a display of the display electrode, the second time period is a touch period, and the third time period is configured to charge the common electrode through switching the switch.

In one embodiment of the present disclosure, each of the sub-pixel units further comprises a display capacitor electrically connected to the thin film transistor and the corresponding display electrode.

In one embodiment of the present disclosure, each of the sub-pixel units further comprises a common capacitor electrically connected to the switch and the corresponding common electrode.

In one embodiment of the present disclosure, in each of the sub-pixel units, the corresponding first gate line and the corresponding second gate line are arranged on opposite sides of the horizontal black matrix area, respectively.

In one embodiment of the present disclosure, the first gate line is configured to control a level transmission of the first gate line through a plurality of high frequency clock signals; the second gate line is configured to be controlled by a global signal to charge the common electrode through switching the switch.

In one embodiment of the present disclosure, a source signal of the data line is composed of a first time period, a second time period, and a third time period, wherein the first time period is configured to be used by the thin film transistor of the sub-pixel unit to charge a display of the display electrode, the second time period is a touch period, and the third time period is configured to charge the common electrode through switching the switch.

The beneficial effect is that the horizontal black matrix area is configured to be a trace for the corresponding first gate lines and the corresponding second gate line, the thin film transistor and the switch are disposed in the horizontal black matrix area, and the vertical black matrix area is configured to be a trace for the corresponding data line to reduce the chip size by saving chip data lines. At the same time, the width of the side frame can be reduced to increase the screen ratio, so that the aperture ratio can be greatly improved to increase the light transmittance and achieve high brightness.

DESCRIPTION OF DRAWINGS

In order to more clearly illustrate the embodiments or prior art technical solutions embodiment of the present disclosure, will implement the following figures for the cases described in prior art or require the use of a simple introduction. Obviously, the following description of the drawings are only some of those of ordinary skill in terms of creative effort without precondition, you can also obtain other drawings based on these drawings embodiments of the present disclosure.

DETAILED DESCRIPTION OF PREFERRED EMBODIMENTS

Structure and technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, etc., are only directions by referring to the accompanying drawings, and thus the used directional terms are used to describe and understand the present disclosure, but the present disclosure is not limited thereto.

Figure 1:
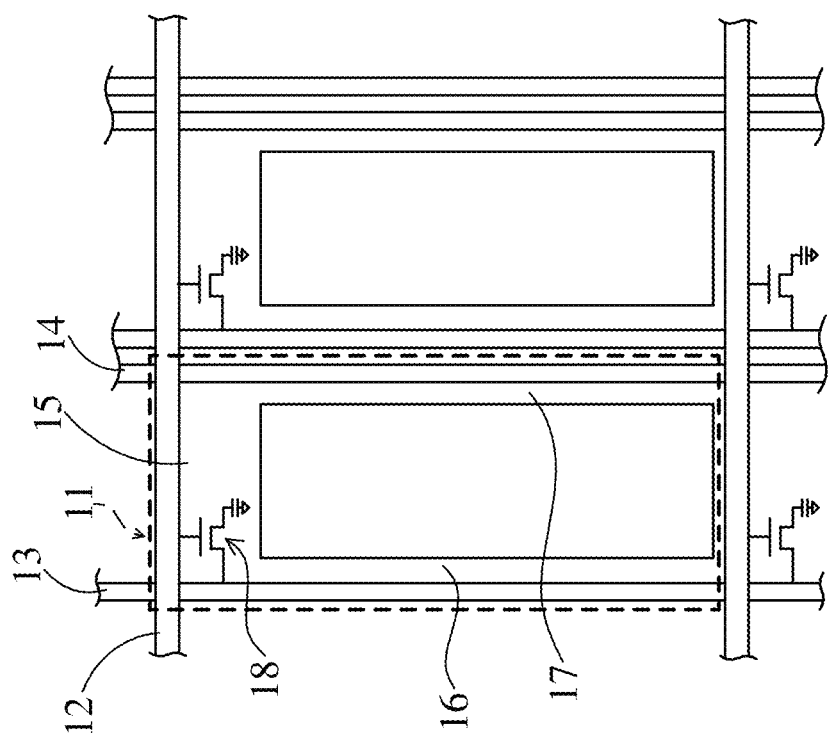
FIG. 1 is a schematic diagram of an array substrate in prior art.
Figure 2:
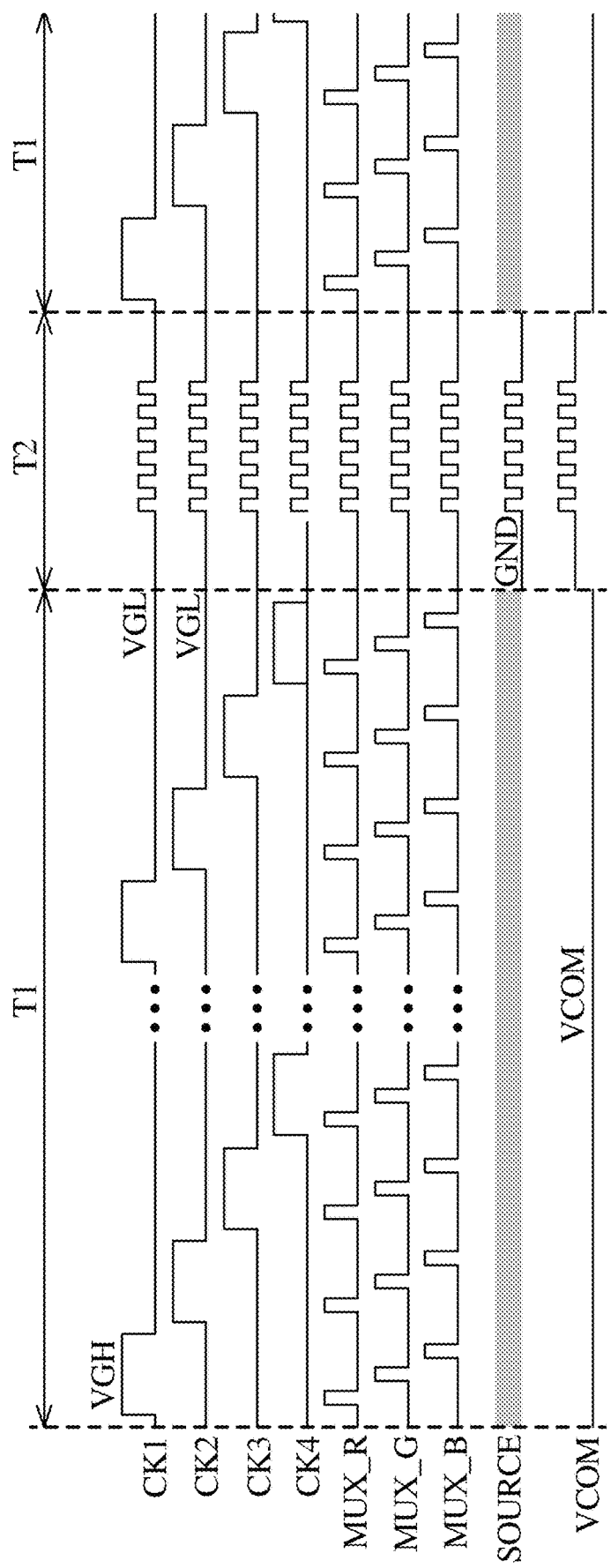
FIG. 2 is a schematic diagram of a timing control of the array substrate in prior art.
Figure 3:
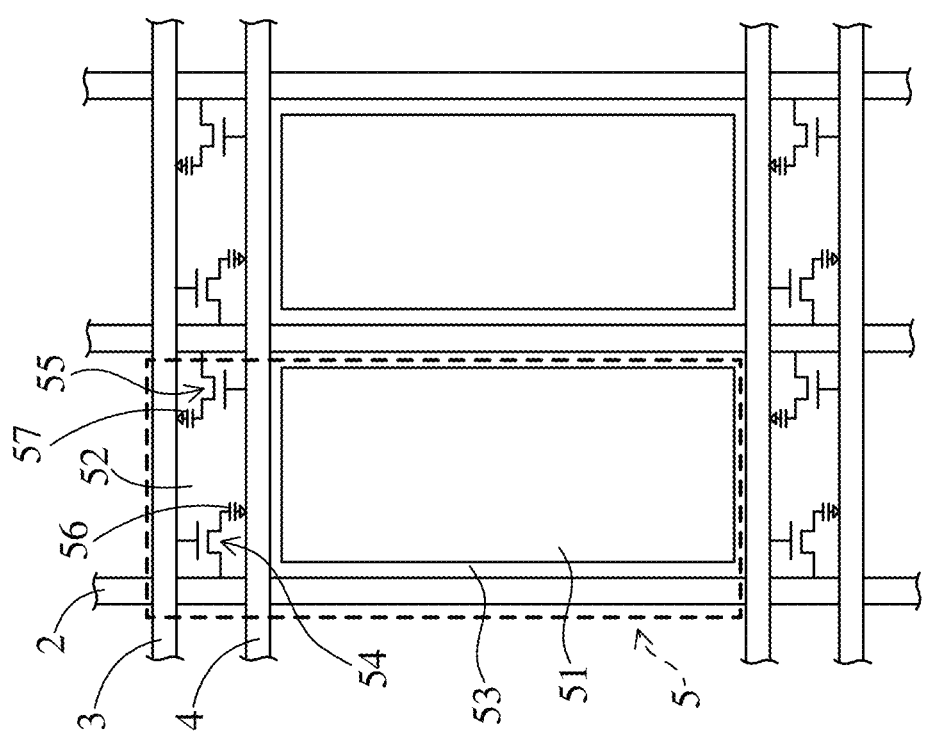
FIG. 3 is a schematic diagram of an array substrate according to a preferred embodiment of the present disclosure.

Referring to FIG. 3, a schematic diagram of an array substrate according to a preferred embodiment of the present disclosure is illustrated. The array substrate comprises a plurality of data lines 2, a plurality of first gate lines 3, a plurality of second gate lines 4, and a plurality of sub-pixel units 5. The detailed structure of each component, assembly relationships, and principles of operation for the present invention will be described in detail hereinafter.

Referring to FIG. 3, the data lines 2 of the array substrate are vertically arranged, and the first gate lines 3 and the second gate lines 4 of the array substrate are horizontally arranged, wherein the sub-pixel units 5 of the array substrate are surrounded by the data lines 2 and the first gate lines 3, and each of the second gate 4 lines is juxtaposed on one side of the corresponding first gate line 3.

Referring to FIG. 3, each of the sub-pixel units 5 defines a color filter area 51, a horizontal black matrix area 52, and a vertical black matrix area 53, wherein the horizontal black matrix area 52 and the vertical black matrix area 53 are located on two adjacent sides of the color filter area 51, respectively. The sub-pixel unit 5 comprises a thin film transistor 54, a switch 55, a display electrode (not shown), and a common electrode (not shown). The thin film transistor 54 of the sub-pixel unit 5 is configured to electrically connect the display electrode and the corresponding first gate line 3, and the switch 55 of the sub-pixel unit 5 is configured to electrically connect the common electrode and the corresponding second gate line 4.

In the embodiment, the display electrode and the common electrode for touch sensing are disposed in units of the sub-pixel unit 5 through the array substrate. Thereby a higher resolution array substrate can be completed, and a higher resolution touch display can be realized.

Referring to FIG. 3, in each of the sub-pixel units 5, the corresponding first gate line 3 and the corresponding second gate line 4, the thin film transistor 54, and the switch 55 are arranged on the horizontal black matrix area 52, and the corresponding data line 2 arranged on the vertical black matrix area 53.

Referring to FIG. 3, in the embodiment, each of the sub-pixel units 5 further comprises a display capacitor 56 and a common capacitor 57, wherein the display capacitor 56 is electrically connected to the thin film transistor 54 and the corresponding display electrode, and the common capacitor 57 is electrically connected to the switch 55 and the corresponding common electrode. In addition, in each of the sub-pixel units 5, the corresponding first gate line 3 and the corresponding second gate line 4 are arranged on opposite sides of the horizontal black matrix area 52, respectively.

Referring to FIG. 3, in the embodiment, the first gate line 3 is configured to control level transmission of the first gate line 3 through a plurality of high frequency clock signals, and the second gate line 4 is configured to be controlled by a global signal to charge the common electrode through switching the switch 55.

Referring to FIG. 3, in the embodiment, a source signal of the data line 2 is composed of a first time period, a second time period, and a third time period, wherein the first time period is configured to be used by the thin film transistor 54 of the sub-pixel unit 5 to charge a display of the display electrode, the second time period is a touch period, and the third time period is configured to charge the common electrode through switching the switch 55.

In addition, the present disclosure provides a touch display screen, the touch display screen includes an upper substrate, a lower substrate disposed opposite (now shown), and common electrodes disposed on the upper substrate and/or the lower substrate, wherein the common electrode corresponds to the sub-pixel units and is used for fingerprint recognition.

It is noted that a principle of fingerprint recognition using self-capacitance is provided by the embodiment of the present disclosure. When a user's finger is close to a sensing electrode, the surface of the finger skin has uneven ridges and valleys, and a distance between the surface and the sensing electrode is also different. Therefore, capacitance values of the sensing electrode and the common electrode are affected, and charging time of a fingerprint identification signal on the sensing electrode is prolonged. By detecting the finger touching the sensing electrode, the difference of the signals received by the sensing electrodes at each moment can detect a two-dimensional pattern of the fingerprints of the corresponding finger from ridges and valleys, thereby achieving fingerprint recognition.

According to the design above, the horizontal black matrix area 52 is configured to be a trace for the corresponding first gate lines 3 and the corresponding second gate line 4, the thin film transistor 54 and the switch 55 are disposed in the horizontal black matrix area 52, and the vertical black matrix area 53 is configured to be a trace for the corresponding data line 2 to reduce the chip size by saving chip data lines. At the same time, the width of the side frame can be reduced to increase a screen ratio, so that an aperture ratio can be greatly improved to increase light transmittance and achieve high brightness.

Figure 4:
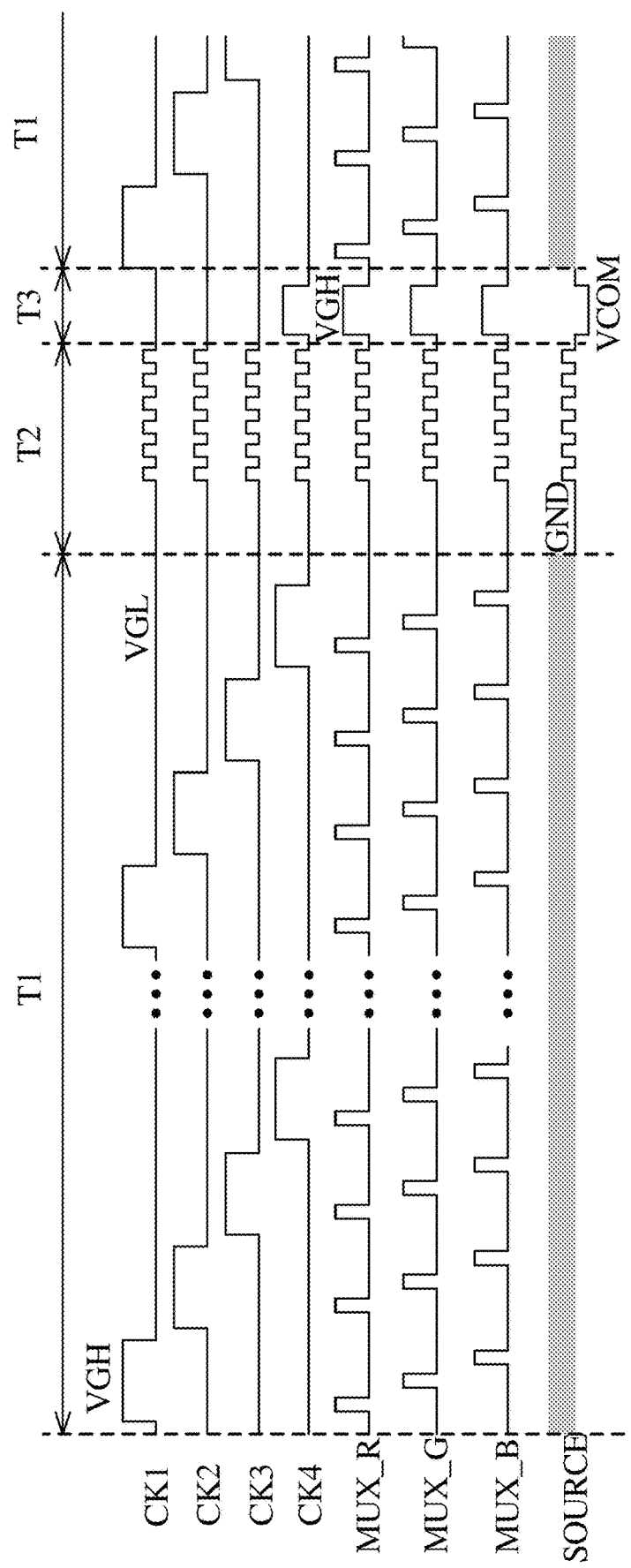
FIG. 4 is a schematic diagram of the array substrate to timing control according to a preferred embodiment of the present disclosure.

Referring to FIGS. 3-4, the present disclosure provides a driving method of the array substrate, wherein the method comprises transmitting a source signal to the data line 2, wherein the source signal is composed of a first time period T1, a second time period T2, and a third time period T3. The first time period T1 is configured to be used by the thin film transistor of the sub-pixel unit to charge a display of the display electrode, the second time period T2 is a touch period, and the third time period T3 is configured to charge the common electrode through switching the switch 55. In the embodiment, in the first time period T1 and the second time period T2, the global signal is at a low level, so that the switches 55 on the second gate line 4 are simultaneously turned off. In addition, in the third time period T3, the global signal is at a high level, so that the switches 55 on the second gate line 4 are simultaneously turned on.

As described above, the driving method of the array substrate of the disclosure can realize three kinds of timing control to meet the requirements of display and touch. In addition, the horizontal black matrix area 52 is configured to be a trace for the corresponding first gate lines 3 and the corresponding second gate line 4, the thin film transistor 54 and the switch 55 are disposed in the horizontal black matrix area 52, and the vertical black matrix area 53 is configured to be a trace for the corresponding data line 2 to reduce the chip size by saving chip data lines. At the same time, the width of the side frame can be reduced to increase the screen ratio, so that the aperture ratio can be greatly improved to increase the light transmittance and achieve high brightness.

The present disclosure has been described with preferred embodiments thereof and it is understood that many changes and modifications to the described embodiments can be carried out without departing from the scope and the spirit of the invention that is intended to be limited only by the appended claims.

What is claimed is:

1. An array substrate, comprising:
   a plurality of data lines, a plurality of first gate lines, a plurality of second gate lines, and a plurality of sub-pixel units surrounded by the data lines and the first gate lines, wherein each of the second gate lines is juxtaposed on one side of corresponding first gate line;
   wherein each of the sub-pixel units defines a color filter area, a horizontal black matrix area, and a vertical black matrix area; the horizontal black matrix area and the vertical black matrix area are located on two adjacent sides of the color filter area, respectively; sub-pixel unit comprises a thin film transistor and a switch, the thin film transistor is configured to electrically connect a display electrode and the corresponding first gate line, the switch is configured to electrically connect a common electrode and corresponding second gate line;
   in each of the sub-pixel units, the corresponding first gate line, the corresponding second gate line, the thin film transistor, and the switch are arranged in the horizontal black matrix area, and the corresponding data line is arranged in the vertical black matrix area;
   the data lines of the array substrate are vertically arranged, and the first gate lines and the second gate lines of the array substrate are horizontally arranged.

2. The array substrate according to claim 1, wherein each of the sub-pixel units further comprises a display capacitor electrically connected to the thin film transistor and the corresponding display electrode.

3. The array substrate according to claim 1, wherein each of the sub-pixel units further comprises a common capacitor electrically connected to the switch and the corresponding common electrode.

4. The array substrate according to claim 1, wherein in each of the sub-pixel units, the corresponding first gate line and the corresponding second gate line are arranged on opposite sides of the horizontal black matrix area, respectively.

5. The array substrate according to claim 1, wherein the first gate line is configured to control level transmission of the first gate line through a plurality of high frequency clock signals; the second gate line is configured to be controlled by a global signal to charge the common electrode through switching the switch.

6. The array substrate according to claim 1, wherein a source signal of the data line is composed of a first time period, a second time period, and a third time period, wherein the first time period is configured to be used by the thin film transistor of the sub-pixel unit to charge a display of the display electrode, the second time period is a touch period, and the third time period is configured to charge the common electrode through switching the switch.

7. A driving method of the array substrate according to claim 1, comprising steps of:
   transmitting the source signal to the data line, wherein the source signal is composed of the first time period, the second time period, and the third time period;
   wherein the first time period is configured to be used by the thin film transistor of the sub-pixel unit to charge a display of the display electrode, the second time period is a touch period, and the third time period is configured to charge the common electrode through switching the switch.

8. The driving method according to claim 7, wherein in the first time period and the second time period, a global signal is at a low level, so that the switch on the second gate line is simultaneously turned off.

9. The driving method according to claim 7, wherein in the third time period, a global signal is at a high level, so that the switch on the second gate line is simultaneously turned on.

10. An array substrate, comprising:
a plurality of data lines, a plurality of first gate lines, a plurality of second gate lines, and a plurality of sub-pixel units surrounded by the data lines and the first gate lines, wherein each of the second gate lines is juxtaposed on one side of corresponding first gate line;
wherein each of the sub-pixel units defines a color filter area, a horizontal black matrix area, and a vertical black matrix area; the horizontal black matrix area and the vertical black matrix area are located on two adjacent sides of the color filter area, respectively; sub-pixel unit comprises a thin film transistor and a switch, the thin film transistor is configured to electrically connect a display electrode and the corresponding first gate line, the switch is configured to electrically connect a common electrode and corresponding second gate line;
in each of the sub-pixel units, the corresponding first gate line, the corresponding second gate line, the thin film transistor, and the switch are arranged in the horizontal black matrix area, and the corresponding data line is arranged in the vertical black matrix area.

11. The array substrate according to claim 10, wherein each of the sub-pixel units further comprises a display capacitor electrically connected to the thin film transistor and the corresponding display electrode.

12. The array substrate according to claim 10, wherein each of the sub-pixel units further comprises a common capacitor electrically connected to the switch and the corresponding common electrode.

13. The array substrate according to claim 10, wherein in each of the sub-pixel units, the corresponding first gate line and the corresponding second gate line are arranged on opposite sides of the horizontal black matrix area, respectively.

14. The array substrate according to claim 10, wherein the first gate line is configured to control level transmission of the first gate line through a plurality of high frequency dock signals; the second gate line is configured to be controlled by a global signal to charge the common electrode through switching the switch.

15. The array substrate according to claim 10, wherein a source signal of the data line is composed of a first time period, a second time period, and a third time period, wherein the first time period is configured to be used by the thin film transistor of the sub-pixel unit to charge a display of the display electrode, the second time period is a touch period, and the third time period is configured to charge the common electrode through switching the switch.

* * * * *